US010972747B2

(12) United States Patent
Mrak et al.

(10) Patent No.: US 10,972,747 B2
(45) Date of Patent: Apr. 6, 2021

(54) IMAGE OR VIDEO ENCODING AND DECODING

(71) Applicant: BRITISH BROADCASTING CORPORATION, London (GB)

(72) Inventors: Marta Mrak, London (GB); Saverio Blasi, London (GB); Ebroul Izquierdo, London (GB); shenglan Huang, Beijing (CN)

(73) Assignee: British Broadcasting Corporation, London (GB)

( * ) Notice: Subject to any disclaimer, the term of this patent is extended or adjusted under 35 U.S.C. 154(b) by 0 days.

(21) Appl. No.: 16/486,394

(22) PCT Filed: Feb. 19, 2018

(86) PCT No.: PCT/GB2018/050432
§ 371 (c)(1),
(2) Date: Aug. 15, 2019

(87) PCT Pub. No.: WO2018/150201
PCT Pub. Date: Aug. 23, 2018

(65) Prior Publication Data
US 2020/0007884 A1 Jan. 2, 2020

(30) Foreign Application Priority Data
Feb. 17, 2017 (GB) ..................... 1702646

(51) Int. Cl.
*H04N 19/50* (2014.01)
*H04N 19/103* (2014.01)
(Continued)

(52) U.S. Cl.
CPC ........... *H04N 19/50* (2014.11); *H04N 19/103* (2014.11); *H04N 19/127* (2014.11); *H04N 19/154* (2014.11)

(58) Field of Classification Search
None
See application file for complete search history.

(56) References Cited

U.S. PATENT DOCUMENTS

2002/0025001 A1* 2/2002 Ismaeil ............... H04N 19/156
375/240.16
2004/0213347 A1 10/2004 Kajiwara

FOREIGN PATENT DOCUMENTS

| EP | 1503595 A2 | 2/2005 |
| EP | 1849304 | 8/2006 |
| WO | 2008/079330 A1 | 7/2008 |

OTHER PUBLICATIONS

Chen et al., "Delay-Rate-Distortion Model for Real-Time Video Communication," IEEE Transactions on Circuits and Systems for Video Technology, vol. 25, No. 8, Aug. 2015, pp. 1376-1394. (Year: 2015).*

(Continued)

*Primary Examiner* — Christopher Braniff
(74) *Attorney, Agent, or Firm* — Michael Best and Friedrich LLP

(57) ABSTRACT

A method of encoding image or video content within a set of targets such as a time, a complexity, quality, and bitrate, using an encoder having a plurality of coding configurations, comprises setting an initial coding configuration in the encoder, where coding configurations differ one from the other in the number of options tested for each of one or more tools. A first part of the content is encoded in the initial configuration and measures are made of the number of times a specified tool is used and a representative time taken to test an option for that specified tool. From those measures a prediction is made of the time difference between the time taken to encode content using the initial coding configuration and the time taken to encode content using another (Continued)

Figure 1:
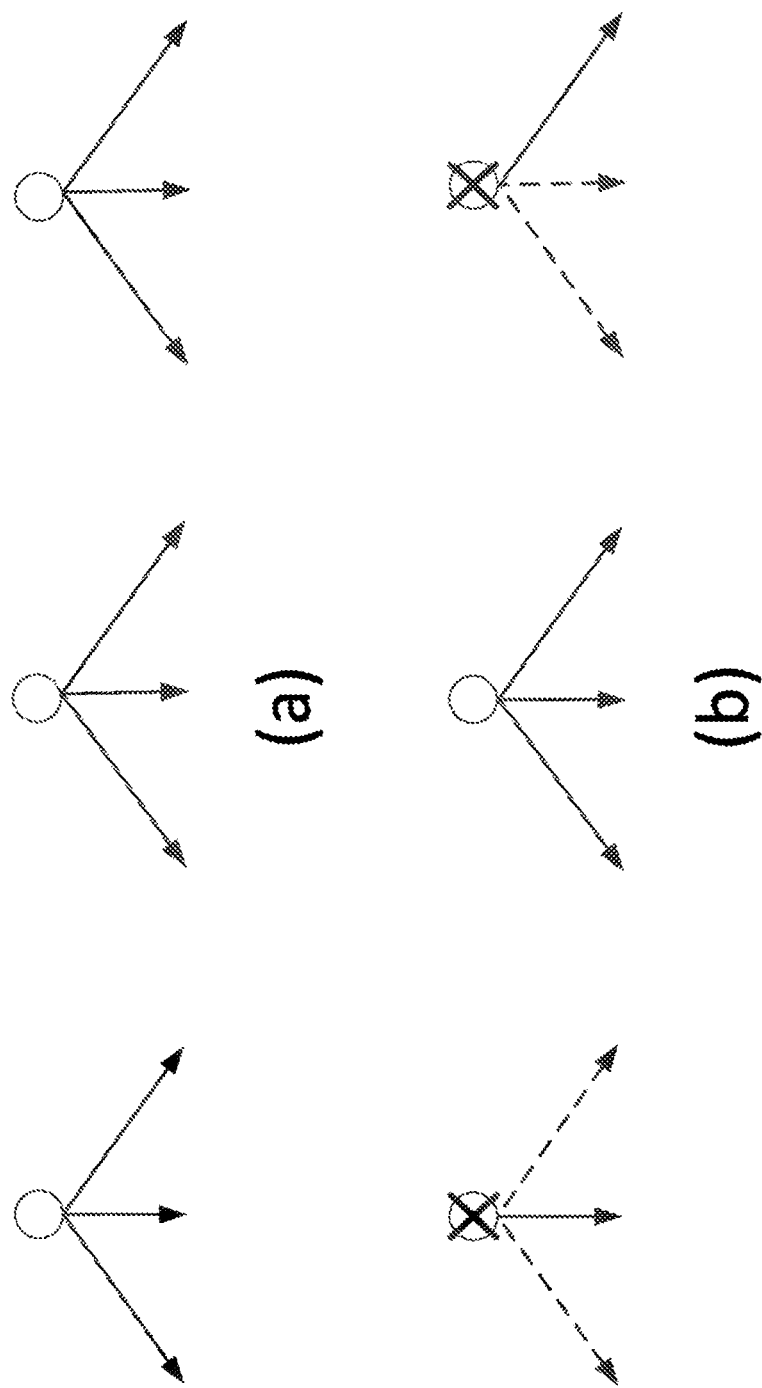

coding configuration in which a different number of options are tested for that specified tool.

16 Claims, 2 Drawing Sheets

(51) Int. Cl.
*H04N 19/127* (2014.01)
*H04N 19/154* (2014.01)
*H04N 19/156* (2014.01)
*H04N 19/179* (2014.01)
*H04N 19/10* (2014.01)

(56) References Cited

OTHER PUBLICATIONS

Chin, Q., et al. "Delay-Rate-Distortion Model for Real-Time Video Communication" IEEE Transactions on Circuits and Systems for Video Technology, vol. 25, No. 8, Aug. 2015 (19 pages).
British Intellectual Property Office Action dated Aug. 8, 2017 for corresponding British Application No. GB1702646.9 (4 pages).
International Search Report & Written Opinion dated Apr. 19, 2018 for corresponding International Application No. PCT/GB2018/050432 (19 pages).

* cited by examiner

… (1) …

IMAGE OR VIDEO ENCODING AND DECODING

TECHNICAL FIELD

This invention relates to image or video encoding and decoding.

BACKGROUND

Modern video compression schemes provide considerable flexibility with respect to the tools and parameters that can be set and used to obtain an encoding that suits each specific need. In particular, the bitrate of the encoded bitstream, the quality of the decoded sequence, and the complexity of the encoding, can all be controlled by means of appropriately selecting specific parameters. Unfortunately, advanced video compression relies on numerous interdependencies between different parts of the compression scheme, which means that using a given parameter setting or tool in a specific way at a given point during the coding loop can have undesirable effects on all subsequent encoder tools, in fact affecting the general performance of the encoder. Due to these complex mechanisms, understanding and predicting such effects can be very difficult.

On the other hand, for many applications it is highly desirable to understand how parameters that affect complexity, bitrate and quality affect each other. In many cases, it would be desirable to have an accurate estimate of how much time is required to compress and subsequently transmit a given sequence, where a sequence may be the whole or part of a specific video clip. Assume for instance the case of a journalist in a remote location in the field, having to contribute video content to a centralised repository. While the time taken to transmit a given sequence or chunk of a sequence can be accurately estimated from the bit rate, typical encoding tools can only provide coarse estimates of how much time it will require to encode the content, based on pre-determined statistics or a pre-analysis of the content. Such estimates are generally used before starting to encode the content to set some generic parameters which affect the complexity, quality and rate of the compressed bitstream. In practice though, the effects of these parameters are content dependent. This means that when using conventional methods, accurate prediction of how much time the actual encoding and uploading would take is rarely achievable, which means the journalists would in practice have to compromise. In case of strict deadlines, they would necessarily have to sacrifice quality to obtain a faster encoding. Still there is no guarantee that the encoding and uploading of content could effectively happen within the time constraint.

SUMMARY

In one aspect there is provided a method of encoding image or video content within a set of fixed or adaptable targets, which may include a target time period, a target complexity, a target output quality, or a target output bitrate, using an encoder having a plurality of coding configurations, the method comprising the steps of selecting an initial coding configuration; encoding a first part of the content using the encoder in the initial configuration; determining content based usage measures for the initial configuration; deriving from those measures predictions of the time difference between the time taken to encode content using the initial coding configuration and the time taken to encode content using at least some of the other coding configurations; determining from the predictions of the time difference and the given targets a second coding configuration meeting given targets and; encoding a second or subsequent part of the content using the second or subsequent coding configuration.

Preferably, the method utilises a plurality of coding tools each having a set of selectable options, where options are selected dynamically for each tool during encoding by testing of options, wherein said coding configurations differ one from the other in the number of options tested for each of one or more tools. The step of determining content based usage measures for the initial configuration may comprise measuring the number of times a tool is used and measuring a representative time taken to test an option for a tool. A reduction in the number of options tested for a tool may be contingent upon an analysis of an element of content indicating use of a particular option for that tool for that element of content or contra-indicating use of one or more options for that tool for that element of content.

The plurality of coding configurations may be ranked independently of content on the a priori effect on the quality of encoding and said step of selecting a second coding configuration meeting the given targets takes into consideration said ranking.

The given may include an overall target time to encode and transmit content, and where a target time taken to encode content is derived from an overall target time to encode and transmit content and from a bit rate measure.

In another aspect, there is provided a method of encoding image or video content utilising a plurality of coding tools each having a set of selectable options, where options are selected dynamically during encoding by testing of options; wherein to vary the speed of encoding the number of tools used, or options tested for a tool, may be changed; characterised by predicting repeatedly throughout encoding by analysis of content the difference in the time taken to encode content associated with a respective change in the number of tools used or options tested for one or more of the tools.

The method may further comprise the step of determining a target time difference from a target time taken to encode the content and from the time elapsed in encoding and through use of said predictions changing the number of tools used or options tested for at least one tool accordingly.

The step of varying the number of tools used or options tested may comprise for each tool the conduct of an analysis on an element of content and dependent on that analysis precluding testing of one or more options for that tool on that element of content. The precluding of testing of one or more options for a tool may be enabled or disabled for each tool according to a coding configuration. Said analysis may be conducted for a tool irrespective of whether the precluding of testing of one or more options for that tool is enabled or disabled in the current coding configuration. The step of predicting the difference in the time taken to encode content associated with a respective change in the number of options tested for one or more of the tools may comprise, for each tool, measuring the number of times that through said analysis testing of one or more options for that tool was or would have been precluded and measuring a representative time taken to test an option.

The effects of each change in the number of options tested may be ranked on the a priori effect on the quality of encoding.

A target time taken to encode content may be derived from an overall target time to encode and transmit content and from a bit rate measure.

In a further aspect, there is provided a method of decoding image or video content utilising a plurality of decoding tools, where tools are selected dynamically during decoding to vary the speed of decoding, comprising the step of predicting repeatedly throughout decoding by analysis of content the difference in the time taken to decode content associated with a respective change in the number of tools selected.

The method may further comprise the step of determining a target time difference from a target time taken to decode the content and from the time elapsed in decoding and through use of said predictions changing the number of tools used.

The effects of each change in the number of tools used may be ranked on the a priori effect on the quality of decoding.

Some methods according to the invention adapt and change the encoding tools while encoding in order to meet specific time constraints (in terms of total time from the instant the processing starts, to the instant the uploaded compressed content reaches the destination). Some examples of the methods can effectively guarantee that the maximum quality that is theoretically possible to achieve in the time constraint is actually obtained.

Assuming a pre-known set of computing resources and network conditions, the encoder should advantageously be able to predict and adapt the encoding parameters so that a specific target total time can be met, while at the same time maximising the output quality.

Typical encoders achieve very high compression efficiency by means of complex encoding loops in which a multitude of possible tools are used repeatedly during the encoding. When using a given tool on a specific portion of the content, the encoder can select among a variety of possible options. The best option is then selected, usually by minimising a cost function which takes into account the effects of using that option in terms of quality of the reconstructed signal and generated bitrate. For instance, each frame is partitioned in blocks which are separately compressed. The encoder may be able to select among a variety of different block sizes. Compression then typically relies on obtaining a prediction of the content of the current block using previously encoded information: such prediction is then subtracted from the current content, to obtain a set of residuals. Depending on the accuracy of the prediction steps, such residuals may be very easy to compress, hence resulting in highly efficient compression. The encoder may therefore select among various means to perform this prediction (for instance, whether using previously encoded content from within the same block or frame (intra-prediction) or from previously encoded blocks or frames in the sequence (inter-prediction)). Subsequent steps in the encoding loop may require further decisions, until a final bitstream is produced.

Brute-force approaches in which all possible options are tested are generally believed to result in the best compression efficiency. On the other hand, the complexity of such schemes can be very high and not be acceptable for many applications. For this reason, modern encoder solutions use techniques which aim at speeding up the encoder, by avoiding certain selection steps in the coding loop based on the computation of specific metrics. Assume for instance that the encoder must select whether a specific block should be encoded using inter-prediction or intra-prediction. An encoder could brute-force test both options and then select the best one in terms of a cost function On the other hand, a more practical encoder may benefit from using a so called "speed-up" which affects this decision. Thus, before performing the prediction step, the encoder would first perform an analysis step. Such analysis may for instance compute pre-determined metrics on the content of the block being encoded, or may be based on previous encoder decisions, and so on. As a result of such analysis, the speed-up may then force the encoder to only use intra-prediction, and not test inter-prediction at all. Typically the time required for such analysis is negligible with respect to the rest of the required time for encoding. So the time saved in testing one or more options which are ruled out by the analysis results in a much faster encoding. But the selected option may be sub-optimal, yielding higher bitrates and/or lower quality of the decoded sequence. An example of using a speed-up is shown in FIG. 1, where an encoder is shown using a given tool three times (for instance, it may be testing which prediction mode to use in three blocks in the sequence). In (a), the encoder does not make use of any speed up and therefore tests all possible options in each block; conversely, in (b), the encoder makes use of a speedup which, when triggered (marked with an X) based on some analytics, leading the encoder to selecting and using one option (marked with a solid line), without testing the other options (marked with dashed line).

It should be noted that while in the previous example the speed-up has the effect of completely removing the need for testing and selecting among a variety of options, other types of speed-ups may be used which just reduce the number of options to test. In this case the encoder would still need to test multiple options and perform a decision, but on a reduced set of options.

Speed-ups are a powerful way to drastically reduce the encoding time necessary to compress a sequence. The present invention recognises that they can be used to dynamically adjust the complexity of an encoder. It should be noted though that enabling or disabling the usage of a given speed-up can have different effects on encoding time and coding efficiency which depends on a variety of factors, including the actual content being encoded, the coding configuration being used for encoding, and the usage of other speed-ups. Regarding the latter, it is important to highlight that in some cases different speed-ups may affect different components of the encoder loop, and the effects of a given speed-up may be nested within another speed-up. In order to be able to adaptively switch these speed-ups on or off to meet certain time and bitrate requirements, it is therefore necessary to design specific algorithms which, given a certain initial encoder configuration (in terms of which speed-ups are enabled or disabled), can provide an estimate of how much time would the encode require in all other possible configurations.

While the effects of different speed-ups in terms of expected complexity are very content-dependent, the effects in terms of expected quality of some of the speed-ups can be assumed content independent. Therefore, the possible configurations (enabling or disabling any given speed-up) could be "sorted" with respect to the expected output quality, from the one providing maximum quality (corresponding to the case when no speed-ups are enabled), to the one providing the worst quality (corresponding to the case when all speed-ups are enabled). Moreover, the effects of enabling a specific speed-up can be typically assumed to be detrimental to the expected quality with respect to encoding without enabling such speed-up. Therefore, when pursuing higher target qualities, the encoder may typically favour configurations in which speed-ups are disabled.

Figure 2:
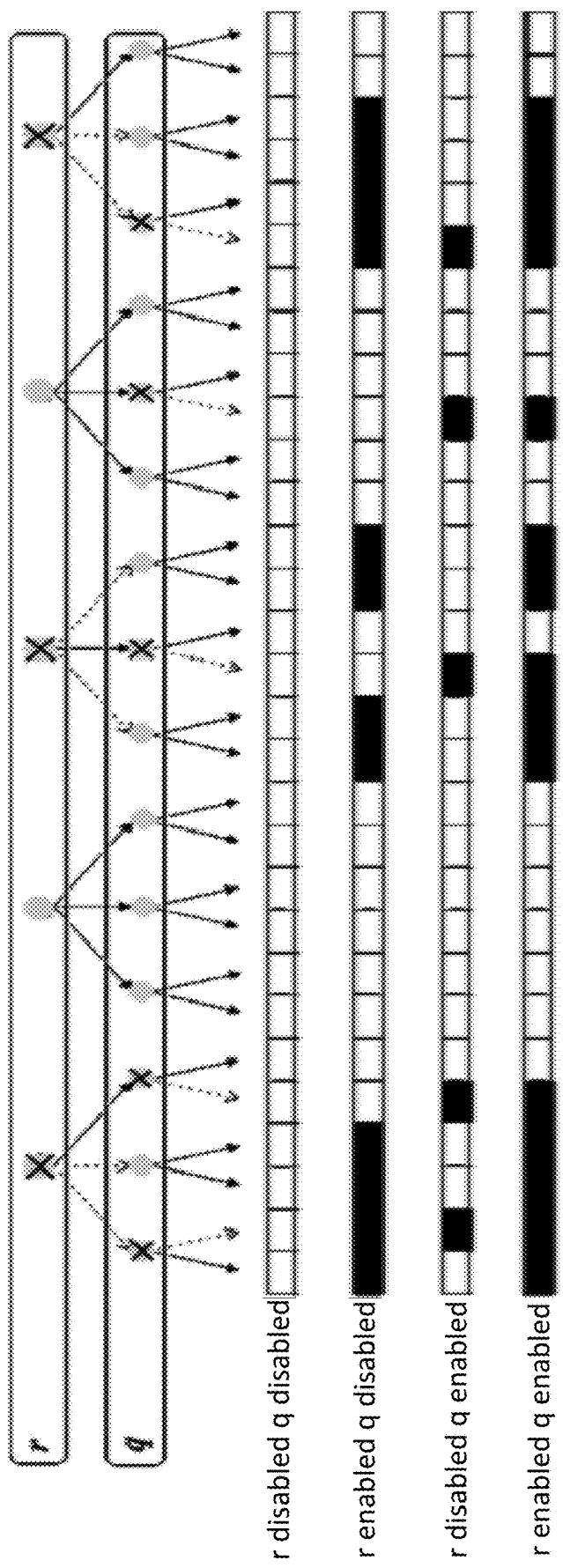

The invention will now be described by way of example with reference to the accompanying drawings, in which:

FIG. 1 illustrates (a) all options are tested by an encoder and (b) the effect of a speed-up FIG. 2 illustrates the time required by an encoder in all possible configurations using two nested speed-ups Assume that the encoder can be configured in C different possible configurations. An initial configuration i is selected. The selection of such initial configuration can be performed by means of pre-determined statistics, or pre-analysis of the sequence. Typical encoders will encode the whole sequence using the initial configuration i. Conversely by means of performing an analysis based on information extracted during the encoding of a given part of the sequence with a given configuration, a decision can be made to encode the subsequent part of the encoding with a different configuration in order to meet specific targets. Such decision can then be repeated after encoding each part of the sequence.

As an example, assume that such targets consist of a total encoding time T. The sequence can be split into a number of N parts. An initial configuration $c_0$ is selected, and the first part is considered. The residual time left to encode the remaining N parts in the sequence is initialised to the total available time, or $T_0 = T$.

Then:
1. The current part n of the sequence is encoded using the selected configuration $c_n$.
2. The time necessary to encode the current part using the selected configuration is measured as $t[c_n]$
3. An analysis of the encoding is performed. Based on such analysis, accurate estimates of the time that it would have taken to encode part n using the other possible are computed as $t[j]$, where $j = 0, \ldots, C-1$
4. The residual time left to encode the remaining subsequent parts in the sequence is computed as $T_{n+1} = T_n - t[c_n]$. The average time available for each remaining part is consequently computed as $$\bar{t}_{n+1} = \frac{T_{n+1}}{N - n - 1}$$

5. The configuration $c_{n+1}$ among all $j = 0, \ldots, C-1$ such that $t[c_{n+1}]$ is the closest to $\bar{t}_{n+1}$ and such that $t[i_{n+1}] \leq \bar{t}_{n+1}$, is determined.
6. If $n < N-1$ the next part $n+1$ is considered, and Step 1 is repeated.

As a further example, assume that such targets consist of a total encoding time T and a maximum output quality achievable in such total encoding time. Assume that the available configurations $j = 0, \ldots, C-1$ can be pre-determinedly sorted according to their impact on the quality when encoding with each configuration. The sequence can be split into a number of N parts. An initial configuration $i_0$ is selected and the first part is considered. The available time to encode the remaining parts in the sequence is initialised to the total available time, as $T_0 = T$.

Then:
1. The current part n of the sequence is encoded using the selected configuration $c_n$.
2. The time necessary to encode using the selected configuration is measured as $t[c_n]$
3. An analysis of the encoding is performed. Based on such analysis, an accurate estimate of the time that it would have taken to encode part n using other possible configurations $j = 0, \ldots, C-1$ is computed as $t[j]$ 4. The residual time left to encode the remaining subsequent parts in the sequence is computed as $T_{n+1} = T_n - t[c_n]$. The average time available for each remaining part is consequently computed as $$\bar{t}_{n+1} = \frac{T_{n+1}}{N - n - 1}$$

5. The configuration $c_{n+1}$ such that the quality associated with $c_{n+1}$ is the maximum among all the configurations $\tilde{J}$ that satisfy $t[\tilde{J}] \leq \bar{t}_{n+1}$ is determined.
6. If $n < N-1$ the next part $n+1$ is considered, and Step 1 is repeated.

As a further example, assume that such targets consist of a total target time T, consisting of the time for encoding $T_e$ and time for transmitting the sequence $T_t$, and a maximum output quality achievable in such total time. Assume that information related on the network status is available at any given time instant so that it is always possible to compute the time necessary to transmit given information on the bit rate of the content that is being transmitted. Assume that the available configurations $j = 0, \ldots, C-1$ can be pre-determinedly sorted according to their impact on the quality when encoding with each configuration. The sequence can be split into a number of N parts. An initial configuration $c_0$ is selected and the first part is considered. The available time to encode and transmit the remaining parts in the sequence is initialised to the total available time, as $T_0 = T$.

Then:
1. The current part n of the sequence is encoded using the selected configuration $c_n$.
2. The time necessary to encode the current part using the selected configuration is measured as $t_e[i_n]$. Based on the achieved bit rate, the time necessary to transmit the current part is computed as $t_t[i_n]$
3. An analysis of the encoding is performed. Based on such analysis, an accurate estimate of the time that it would have taken to encode part n using other possible configurations $j = 0, \ldots, C-1$ is computed as $t[j]$.
4. An analysis of the encoding is performed. Based on such analysis, an accurate estimate of the bit rate that it would have been produced to encode part n using other possible configurations $j = 0, \ldots, C-1$ is computed. Based on such bit rates, the time necessary to transmit the part using other possible configurations $j = 0, \ldots, 2^R - 1$ is computed as $T_t[j]$.
5. The residual time left to encode and transmit the remaining subsequent parts in the sequence is computed as $T_{n+1} = T_n - t_e[c_n] - t_t[c_n]$. The average time available for each remaining part is consequently computed as $$\bar{t}_{n+1} = \frac{T_{n+1}}{N - n - 1}$$

6. The configuration $c_{n+1}$ such that the quality associated with $c_{n+1}$ is the maximum among the configurations $\tilde{J}$ such that $t[\tilde{J}] + t_t[\tilde{J}] \leq \bar{t}_{n+1}$ is determined.
7. If $n < N-1$ the next part $n+1$ is considered, and Step 1 is repeated.

The above examples make use of an analysis step in which, based on information extracted while encoding a part of the sequence using a given configuration i, an accurate estimate of the time that it would have taken to encode part n using other possible configurations is computed.

Assume that the encoder has availability of a number of R speed-ups, each of which can be enabled or disabled. The encoder can therefore be configured to encode a given part of the sequence in $2^R$ different possible configurations. In order to identify whether a speed-up is enabled or disabled in a specific configuration, define a matrix S of size $2^R \times R$ with elements $s_{i,r}$, i=0, . . . , $2^R$–1, r=0, . . . , R–1, where element $s_{i,r}$=0 ($s_{i,r}$=1) denotes that speed-up r is disabled (enabled) in configuration i.

Assume now that the encoder is run on a given part of the sequence using an initial configuration $c_{init}$. The analysis in the aforementioned examples requires the encoder to be able to perform an accurate estimate of the time necessary to encode the same part if a different final configuration $c_{fin}$ was used instead. Formally, denote the time required to encode the considered part using the initial configuration as $t[c_{init}]$; the time required to encode the considered part in a different configuration can be defined as $t[c_{fin}]=t[c_{init}]+\Delta t_{init,fin}$, where $\Delta t_{init,fin}$ is the time difference between encoding using the two configurations. In order to provide these estimates, the effects of the changes between the two configurations must be taken into account.

Single Speed-Up in Isolation:

First, the effects of changing a single speed-up taken in isolation are considered; namely, it is considered how enabling a speed-up affects the encoding with respect to encoding with such speed-up disabled, or conversely, how disabling a speed-up affects the encoding with respect to encoding with such speed-up enabled.

Consider a specific speed-up r which affects the execution of a given tool used within a module in the encoder loop. The execution of the tool is repeated on multiple instances, each time the specific module is called: for instance, if the tool is used within the prediction step, then it will be executed for each prediction unit in the sequence. When r is disabled, each time the encoder executes the given tool, it has to test a number of possible options, denote such number as $K_r$. Conversely, in case r is enabled, then before execution of the tool, the encoder computes an analysis. This analysis results in the encoder triggering or not triggering the speed-up r while executing the current instance of the tool. In such case, instead of testing the whole set of possible $K_r$ options, only a sub-set is actually tested. Notice that, in case when triggered, the speed-up reduces the number of options to one, the encoder still has to perform the operations related with executing such option. For simplicity, assume in the rest of this example that when r is triggered, the speed-up always reduces the number of options to one; the example can be easily extended to the case when a sub-set of multiple options are tested.

If $p_r$ is the average time necessary to execute one option, then each time r is triggered when executing one instance of the tool, the encoder would go from requiring a time of $K_r \times p_r$, to only requiring $p_r$. Denote as $c_{-r}$ and $c_r$ the two specific configurations corresponding to the case in which r is disabled and enabled, respectively, and in which all other speed-ups are left unchanged, or $s_{i,m}=s_{j,m}$, $\forall m \neq r$. Obviously $\Delta t_{-r,r} \leq 0$, in that the encoder will be equally fast or faster when r is enabled than when it is disabled. Also obviously $\Delta t_{r,-r}=-\Delta t_{-r,r}$.

It will be understood that if a speed-up r is enabled, the appropriate analysis will be carried out. Based on the computation of specific metrics, a particular option may be prima facie indicated and therefore selected without testing. It may also be the case—depending on the content—that no option is prima facie indicated and all options still require testing. In the latter case, even though the speed-up is enabled, no time saving ensues. It can be said that the enabled speed-up is "triggered" in the former case where there is no testing (or reduced testing) and an enabled speed-up is not "triggered" when, despite analysis, all options are still tested.

It is also pointed out that—in order to make the measurements made below—the analysis necessarily carried out when a speed-up is enabled, is here carried out each time a tool is used, even where the speed-up is disabled. Whilst such analysis on a disabled speed-up cannot reduce testing time (and is itself to a degree time consuming), the extra benefits outlined below are found greatly to exceed the "cost" of the analysis.

This estimation can be performed as follows.

During the encoding, the following parameters can be measured:

1. The total number of instances the tool is executed, denoted as $N_r$.
2. The total number of times that r is triggered (or would be triggered, if $c_{init}=c_{-r}$) as $N_{r,true}$. Denote as $N_{r,false}=N_r-N_{r,true}$.
3. The average time spent executing an individual option, denoted as $p_r$.

Eventually, $\Delta t_{init,fin}$ can be computed as follows:

$$\Delta t_{init,fin}=(s_{c_{init},r}-s_{c_{fin},r})p_r(K_r-1)N_{r,true}$$

Single Speed-Up in Isolation Assuming Uneven Time Distribution:

The above approach is based on the assumption that time is uniformly distributed while testing different options in different parts of the encoder, namely that the time necessary to execute each option is constant. In most cases though this is not the case and a better estimation can be obtained. In particular, assume that the speed-up r is considered again in isolation. The idea is that the time necessary to execute each option in case r is (or would be) triggered is different than in case it is not triggered. That is say that for content where analysis would indicated a particular tool option, the time taken to use or test that tool option might be expected to be less than for content where use of that tool was not prima facie indicated.

In order to compensate for this, a new estimation can be performed as follows. During the encoding, the following parameters can be measured:

1. The total number of instances the tool is executed, denoted as $N_r$.
2. The total number of times that r is triggered (or would be triggered, if $c_{init}=c_{-r}$) as $N_{r,true}$. Denote as $N_{r,false}=N_r-N_{r,true}$.
3. The average time spent executing an individual option, denoted as $p_r$.
4. The average time spent executing an individual option in case r is (or would be) triggered, $p_{r,true}$
5. The average time spent executing an individual option in case r is not (or would not be) triggered, $p_{r,false}$ After encoding, the ratio between $p_{r,false}$ and $p_{r,true}$ can be computed as:

$$\beta_r = \frac{p_{r,false}}{p}$$

Finally:

$$\Delta t_{init,fin}=\beta_r(s_{c_{init},r}-s_{c_{fin},r})p_r(K_r-1)N_{r,true}$$

Multiple Speed-Ups in Combination:

Consider now the effects of another speed-up q. In case the tool affected by q is orthogonal to the tool affected by r, namely the two tools affect independent parts of the encoding loop, then the effects of the two speed-ups are additive. An example of this could be if the speed-up q affects inter-prediction whereas the speed-up r affects intra-prediction. In this case, the processes affected by the two encoders are completely independent which means their effects can be computed also independently. Switching from a configuration in which q and r are either enabled or disabled can be performed considering the two speed-ups in isolation: first, the effects of enabling (or disabling) r are computed, leading to a certain time difference as from the aforementioned formulas. Then, the effects of enabling (or disabling) q are computed, leading to another time difference. Finally, the two time differences could be added together to obtain the final total time difference.

The above only holds in case the two speed-ups are independent, namely if they are not nested one within the other. A speedup q is defined as nested within a speed-up r if the tool affected by q is evaluated while testing each individual option whilst evaluating the tool affected by r. Consider for instance that, while executing an option among the possible $K_r$ options that are tested during the execution of the tool affected by r, the encoder must further select among a variety of possible $K_q$ sub-options. A speedup q may be designed to speed-up this process. If enabled, when q is triggered the encoder could avoid the testing of all $K_q$ sub-options, and instead perform some analytics so that a single sub-option is executed instead Consider a starting configuration $c_{init}$ where $s_{c_{init},r}=\{0,1\}$ and $s_{c_{init},q}=\{0,1\}$, and a final configuration $c_{fin}$ where $js_{c_{fin},m}=s_{c_{init},m}$, $\forall m \neq r, q$. The goal is again that of computing the time difference $\Delta t_{init,fin}$. Unfortunately, in case $s_{c_{init},r}=1$, namely in case r is enabled in the initial configuration, then in some instances when testing the related tool, not all $K_r$ options are executed. In case the execution of one option is skipped, obviously the information related to whether the nested speed-up is triggered or not cannot be computed (because the encoder skips execution of that option altogether). This means that information regarding encoder decisions or operations on the other skipped options is not available: among these missing data, the number of times the nested speed-up q would have been triggered or not, is also missing. This means that in order to compute the time difference to switch from a configuration in which $s_{c_{init},r}=1$ to a configuration in which $s_{c_{fin},r}=0$, the missing data must be recovered using other information available at encoding time. The following illustrates this process.

During the encoding, the following parameters can be measured:

1. The total number of instances that the tool affected by r is executed, denoted as $N_r$.
2. The total number of times that r is (or would be, if $s_{c_{init},r}=0$) triggered as $N_{r,true}$. Denote as $N_{r,false}=N_r-N_{r,true}$.
3. The total number of instances that the tool affected by q is executed, denoted as $N_q$. Due to the fact that ifs is not triggered the tool affected by q is tested $K_r$ times, whereas if it is triggered, the tool affected by q is tested only once, then: $N_q=N_{r,false}K_r+N_{r,true}$.
4. For each tool in which r is not (or would not be) triggered, the following parameters can be measured:
   a. The total number of times that q is (or would be, if $s_{c_{init},q}=0$) triggered as $N_{q,true,false}$
   b. The total number of times that q is not (or would not be, if $s_{c_{init},q}=0$) triggered as $N_{q,false,false}$. It is easy to show that: $N_{q,true,false}+N_{q,false,false}=K_rN_{r,false}$
5. For each tool in which r is (or would be) triggered, only one option is performed if $s_{c_{init},r}=1$, whereas all options are tested if $s_{c_{init},r}=0$. The following parameters can be measured:
   a. The total number of times that q is (or would be, if $s_{c_{init},q}=0$) triggered while testing an option that is finally selected, as $\overline{N}_{q,true,true}$
   b. In case $s_{c_{init},q}=0$, the total number of times that q would be triggered while testing an option that is not finally selected, as $\tilde{N}_{q,true,true}$. This number cannot be computed if $s_{c_{init},q}=1$.
   c. The total number of times that q is not (or would not be, if $s_{c_{init},q}=0$) triggered as $N_{q,false,true}$.
6. When r is not triggered, the ratio between number of times q is triggered over the total number of times q is tested can be computed as $D_q=N_{q,true,false}/N_{r,false}K_r$
7. The average time spent testing or performing an individual sub-option, denoted as $p_q$.

In case $\tilde{N}_{q,true,true}$ is available, then the total number of times q is (or would be) triggered for tools in which r was not triggered can be then computed as:

$$N_{q,true,true}=\overline{N}_{q,true,true}+\tilde{N}_{q,true,true}$$

On the other hand, if $\tilde{N}_{q,true,true}$ is not available, then the following can be used, where $N_{q,true,true}$ is estimated by looking at the average number of times that q was triggered among the tools in which r is not triggered. This information is in fact always available.

Formally:

$$N_{q,true,true} \approx N_{r,true}D_qK_q$$

Eventually $\Delta t_{init,fin}$ can be computed as follows:

$$\Delta t_{init,fin} = p_q\{(s_{c_{init},q}-s_{c_{fin},q})[(K_q-1)(N_{q,true,true}+N_{q,true,false})] + (s_{c_{init},r}-s_{c_{fin},r})N_{r,true}(K_r-1)K_q\}$$

What have here been referred to as "speed-ups" can of course take a wide variety of forms and will vary from one coding standard (or technique) to another.

Examples are given below in the context of an HEVC software codec implementation, in particular the Turing codec HEVC software implementation:

ECU—early Coding Unit determination (this speed-up avoids testing of smaller block sizes obtained partitioning the current block, and directly selects the current block size instead)

ESD—early SKIP detection (this speed-up avoids testing of inter-prediction modes in a given block, and directly selects the SKIP mode instead)

APS—adaptive partition selection (this speed-up avoids testing of specific inter-prediction modes, leaving the encoder the choice among a reduced set of inter-prediction modes)

CFM—Coded Flag Mode (this speed-up avoids testing of specific inter-prediction modes, leaving the encoder the choice among a reduced set of inter-prediction modes)

FDM—Fast decision for merge (this speed-up avoids testing of inter-prediction modes, and directly selects the merge mode instead)

FDAM—Fast decision for all modes (this speed-up avoids testing of specific inter-prediction modes, leaving the encoder the choice among a reduced set of inter-prediction modes)

MET—Multiple early termination (this speed-up avoids testing of some candidates during the motion search and directly selects the initial starting candidate instead)

RCU—reverse CU algorithm (this speed-up avoids testing of specific block sizes obtained partitioning the current block, leaving the encoder the choice among a reduced set of block sizes)

No sub-pixel ME—no sub-pixel motion estimation (this speed-up avoids testing of sub-pixel motion search candidates)

No quarter-pixel ME—no quarter-pixel motion estimation (this speed-up avoids testing of quarter-pixel motion search candidates)

Fast Intra-prediction (this speed-up avoids testing specific intra-prediction modes in a rate-distortion sense, leaving the encoder the choice among a reduced set of intra-prediction modes)

No RQT (this speed-up disables the RQT search during the transform and quantisation steps and directly selects the maximum transform size instead)

The invention claimed is:

1. A method of encoding image or video content within a set of fixed or adaptable targets, which may include a target time to encode, a target complexity, a target output quality, or a target output bitrate, using an encoder having a plurality of coding configurations and utilising a plurality of coding tools each having a set of selectable options, the method comprising the steps of:
   selecting an initial coding configuration;
   encoding a first part of the content using the encoder in the initial configuration;
   determining content based usage measures for the initial configuration;
   deriving from those measures predictions of the time difference between the time taken to encode content using the initial coding configuration and the time taken to encode content using at least some of the other coding configurations;
   determining from the predictions of the time difference and the given targets a second coding configuration meeting given targets; and
   encoding a second or subsequent part of the content using the second or subsequent coding configuration;
   wherein options are selected dynamically for each tool during encoding by testing of options, wherein said coding configurations differ one from the other in the number of options tested for each of one or more tools; and
   wherein the step of determining content based usage measures for the initial configuration comprises measuring the number of times a tool is used and measuring a representative time taken to test an option for a tool.

2. The method of claim 1, wherein a reduction in the number of options tested for a tool is contingent upon an analysis of an element of content indicating use of a particular option for that tool for that element of content.

3. The method of claim 1, wherein a reduction in the number of options tested for a tool is contingent upon an analysis of an element of content contra-indicating use of one or more options for that tool for that element of content.

4. The method of claim 1, wherein in the second configuration options are tested for a particular tool for which options were not tested in the first configuration.

5. The method of claim 1, wherein in the first configuration options are tested for a particular tool for which options are not tested in the second configuration.

6. The method of claim 1, in which the plurality of coding configurations are ranked independently of content on the a priori effect on the quality of encoding and said step of selecting a second coding configuration meeting the given targets takes into consideration said ranking.

7. The method of claim 1, wherein the given targets include an overall target time to encode and transmit content, and where a target time taken to encode content is derived from an overall target time to encode and transmit content and from a bit rate measure.

8. An encoder configured to perform a method of encoding in accordance with claim 1.

9. A method of decoding image or video content that has been encoded using a method according to claim 1.

10. A decoder configured to perform a method of decoding in accordance with claim 9.

11. A method of encoding image or video content utilising a plurality of tools each having a set of selectable options, where options are selected dynamically during encoding by testing of options; wherein to vary the speed of encoding the number of tools used, or options tested for a tool, may be changed; characterised by predicting repeatedly throughout encoding by analysis of content the difference in the time taken to encode content associated with a respective change in the number of tools used or options tested for one or more of the tools;
   wherein the step of varying the number of tools used or options tested comprises for each tool the conduct of an analysis on an element of content and dependent on that analysis precluding testing of one or more options for that tool on that element of content, and
   wherein the step of predicting the difference in the time taken to encode content associated with a respective change in the number of options tested for one or more of the tools comprises, for each tool, measuring the number of times that through said analysis testing of one or more options for that tool was or would have been precluded and measuring a representative time taken to test an option.

12. The method of claim 11, further comprising the step of determining a target time difference from a target time taken to encode the content and from the time elapsed in encoding and through use of said predictions changing the number of tools used or options tested for at least one tool accordingly.

13. The method of claim 11, wherein the precluding of testing of one or more options for a tool may be enabled or disabled for each tool according to a configuration.

14. The method of claim 13, wherein said analysis is conducted for a tool irrespective of whether the precluding of testing of one or more options for that tool is enabled or disabled in the current configuration.

15. The method of claim 11, in which the effects of each change in the number of options tested are ranked on the a priori effect on the quality of encoding.

16. The method of claim 11, wherein a target time taken to encode content is derived from an overall target time to encode and transmit content and from a bit rate measure.

* * * * *